United States Patent [19]
Nishino et al.

[11] Patent Number: 5,706,140
[45] Date of Patent: Jan. 6, 1998

[54] OPTICAL DISTANCE MEASURING EQUIPMENT

[75] Inventors: Jun Nishino; Hiroshi Takeda, both of Saitama; Sigeru Ryugo, Kanagawa; Hidefumi Ito, Tokyo; Takashi Yoshimura, Kanagawa, all of Japan

[73] Assignees: Kansei Corp., Saitama; Kabushiki Kaisha Koden Seisakusho, Tokyo, both of Japan

[21] Appl. No.: 297,543

[22] Filed: Aug. 31, 1994

[30] Foreign Application Priority Data

Sep. 6, 1993 [JP] Japan .................. 5-245995
Sep. 13, 1993 [JP] Japan ................ 5-054446 U
Dec. 8, 1993 [JP] Japan .................. 5-308415

[51] Int. Cl.⁶ .................................................. G02B 9/04
[52] U.S. Cl. ........................................ 359/793; 359/809
[58] Field of Search ............................... 359/793, 794, 359/795, 710, 798, 809

[56] References Cited

U.S. PATENT DOCUMENTS

| | | |
|---|---|---|
| 4,828,383 | 5/1989 | Kunishige et al. |
| 5,076,678 | 12/1991 | Grossman et al. |
| 5,114,632 | 5/1992 | Soane ............................ 264/22 |
| 5,194,919 | 3/1993 | Katayama ..................... 356/375 |
| 5,307,208 | 4/1994 | Hofbauer et al. ............. 359/710 |
| 5,324,473 | 6/1994 | Baresich ....................... 264/327 |

FOREIGN PATENT DOCUMENTS

| | | |
|---|---|---|
| 0493051 | 7/1992 | European Pat. Off. |
| 0497364 | 8/1992 | European Pat. Off. |
| 2443071 | 6/1980 | France . |
| 9219984 | 11/1992 | WIPO . |

*Primary Examiner*—Mark Hellner
*Attorney, Agent, or Firm*—Longacre & White

[57] ABSTRACT

An optical distance measuring equipment in which light from a light emission element is transmitted to an object through a light transmission lens, and light reflected on the object is received by a light reception element through a light reception lens so that a distance to the object is measured on the basis of light transmitting timing and light receiving timing. In the optical distance measuring equipment, a lens holding member for disposing the light transmission lens and the light reception lens substantially at the same distance relative to the light emission element and the light reception element respectively is provided in front of a light transmission/reception board on which the light emission element and the light reception element are installed.

16 Claims, 12 Drawing Sheets

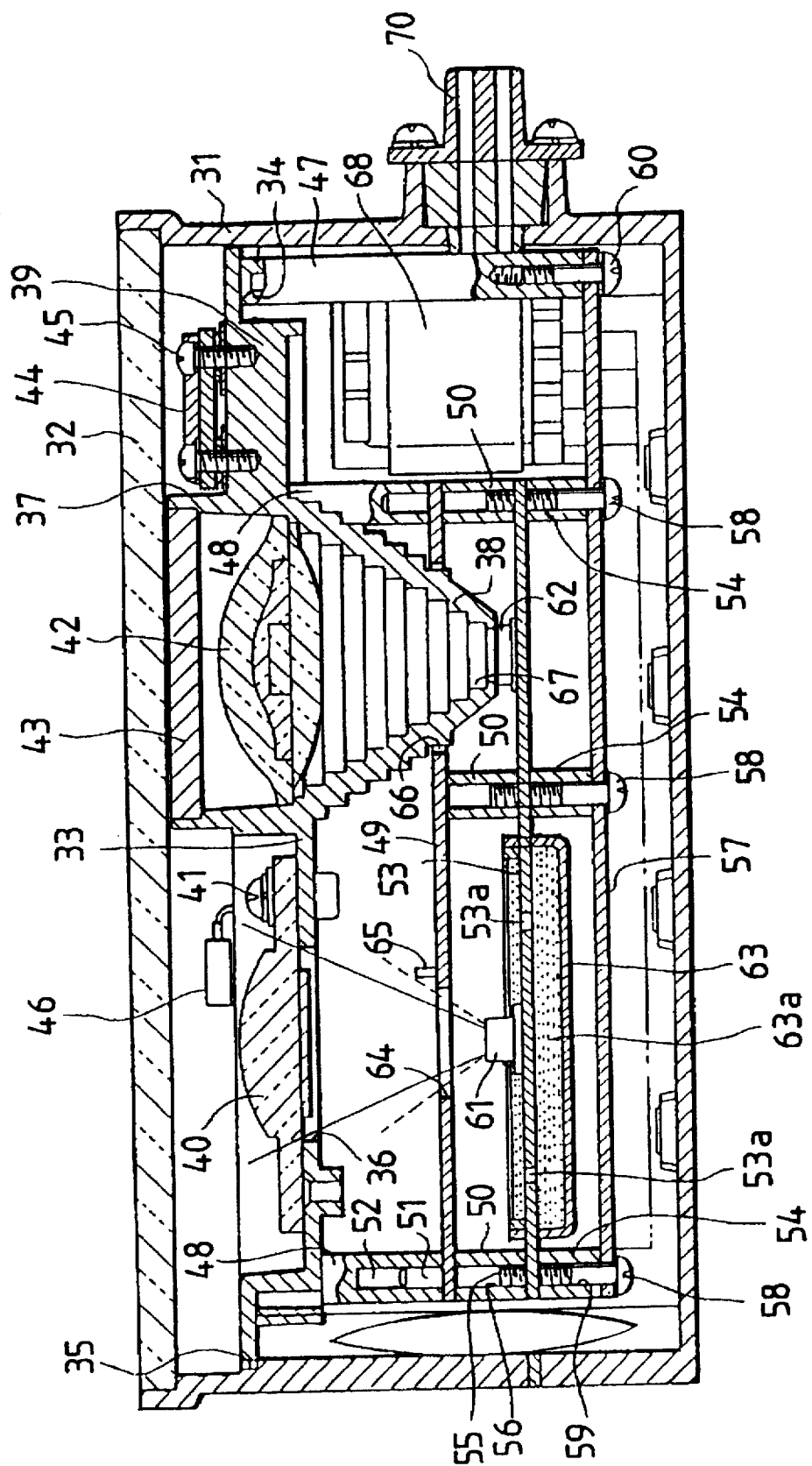

FIG. 16
BEFORE COMBINATION
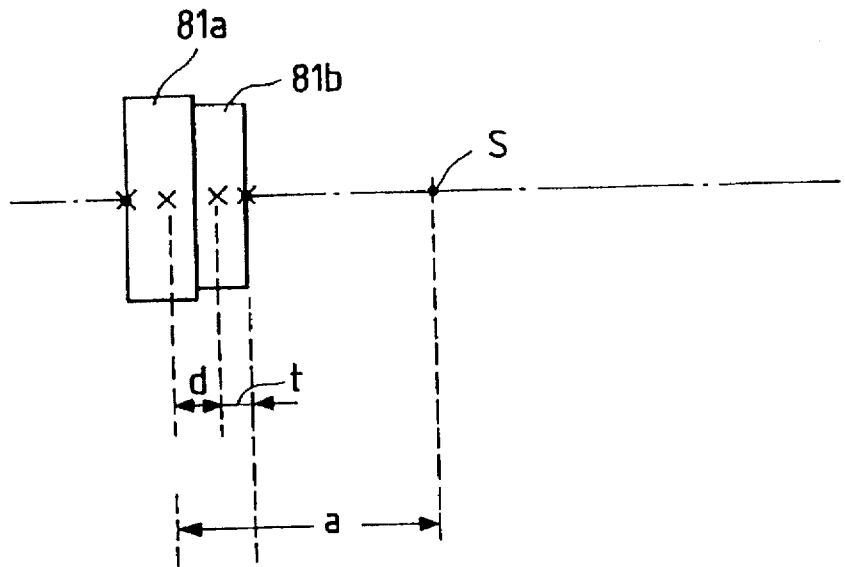
AFTER COMBINATION
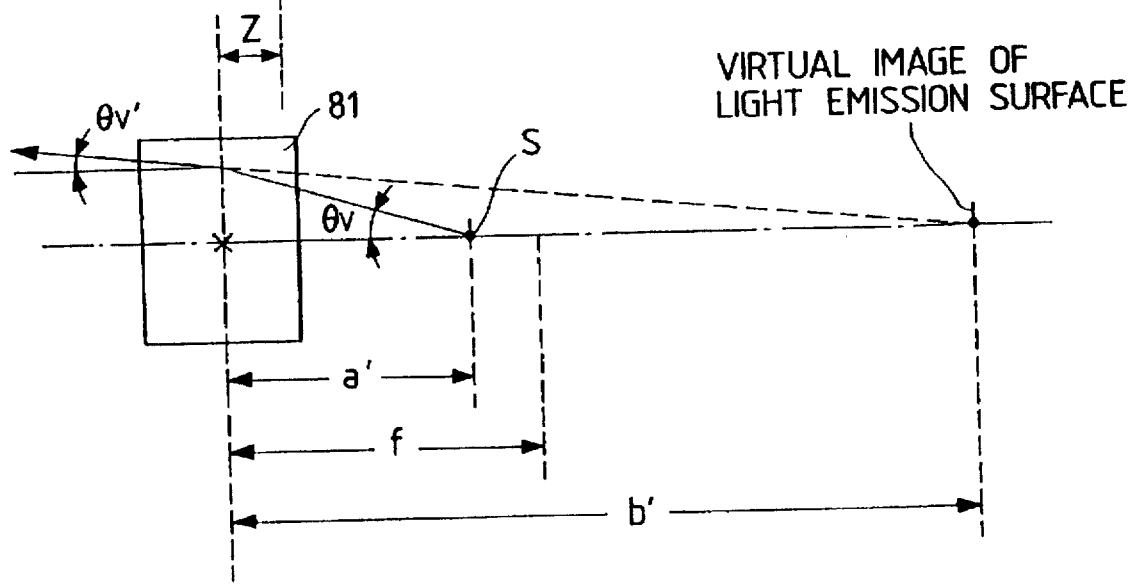

FIG. 17
BEFORE COMBINATION
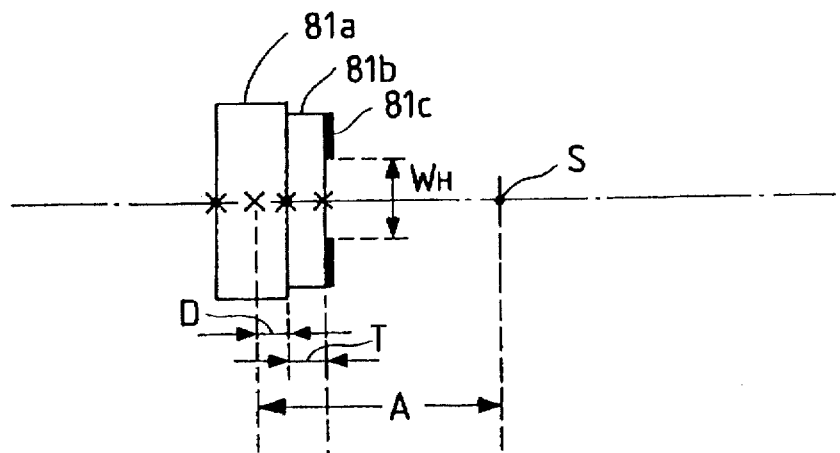
AFTER COMBINATION
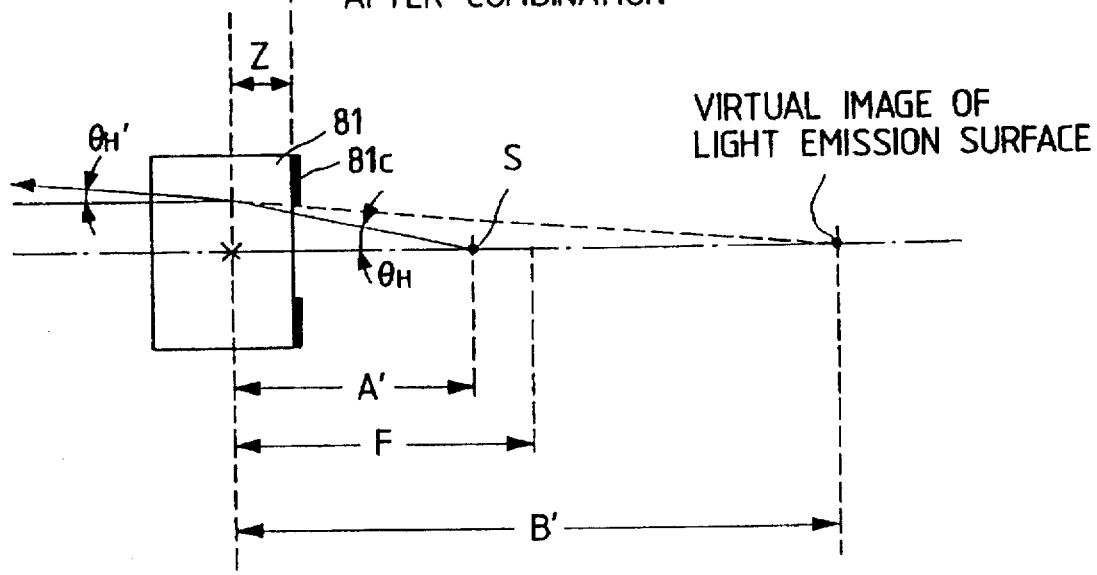

OPTICAL DISTANCE MEASURING EQUIPMENT

BACKGROUND OF THE INVENTION

1. Field of the Invention

The present invention relates to an optical distance measuring equipment, and particularly relates to an optical distance measuring equipment for measuring distance to an object on the basis of the timing when light is transmitted to the object and the timing when the light reflected on the object is received.

2. Description of the Related Art

FIG. 1 is a sectional view illustrating a conventional optical distance measuring equipment (so-called laser radar for vehicle) which is used for a collision prevention alarm. In FIG. 1, reference numeral 1 designates a case body both of which the upper and lower ends are open. A back cover 2 is attached to one of the opening end portions of the case body 1, and a glass plate 3 is attached, as a transparent translucent plate, to the other opening end portion, so as to close the inside to the outside air.

In the case body 1, a light emission board 4 is attached to a part of the inner surface of the back cover 2. On the light emission board 4, there are provided a light emission element 5 such as a semiconductor laser diode, a driving circuit for supplying a driving current to the light emission element 5, and so on, as well as a printed connection pattern. The back cover 2 constitutes means for radiating heat from the light emission element 5.

Reference numeral 6 designates two board-mounting studs standing on the light emission board 4. On the upper ends of the two studs 6, a light transmission lens 7 for transmitting light from the light emission element 5 to the outside of the case body 1 is attached by screws or the like, so that the center of the light transmission lens 7 is on the optical axis of the light from the light emission element 5.

On the other hand, in the case body 1, a plurality of mounting studs are provided to stand on the rest portion of the back cover 2. On the upper ends of the mounting studs 8, there is attached a large operation/power-supply board 9 which is mounted with an operation circuit and a power supply circuit. Further on the operation/power-supply board 9, a light reception board 11 is mounted through a plurality of mounting studs 10 by screws 12 and the like.

Reference numeral 13 designates two light reception elements such as photodiodes mounted on the light reception board 11 together with a light reception amplifier, a printed connection pattern and so on. Light reception lenses 14 integral with each other are disposed one by one on the light reception elements 13 so that their optical axes coincide with their associated optical axes of the light reception elements 13 respectively, as illustrated in the drawing.

The light reception lenses 14 are attached to mounting frames 15 projecting over the side boards of the case body 1 by screws 16 and the like, so as to be parallel to the operation/power-supply board 9, the light reception board 11 and so on.

Reference numeral 17 designates a honey-comb filter provided between the light reception lenses 14 and the glass plate 3 in order to introduce reflected light parallel to the optical axis of the light reception lenses 14 and so on from the outside of the case body 1 to the light reception element 13. Reference numeral 18 designates a light shield wall provided to avoid that light emitted from the light emission element 5 is reflected on the inside of the case body 1 or the like and is incident to the light reception element 13 directly.

Reference numerals 19 and 20 designate connectors provided detachably from each other between the operation/power-supply board 9 and the light emission and reception boards 4 and 11 respectively, in order to supply power to the respective light emission and reception boards 4 and 11 and receive signals therefrom through a control circuit.

FIG. 2 is a block connection diagram of this optical distance measuring equipment which is used for a collision prevention alarm. In FIG. 2, a driving circuit 21 for driving the light emission element 5 is provided on the light emission board 4, and a light reception amplifier 22 is provided on the light reception board 11 together with a printed connection pattern and so on.

In FIG. 2, on the operation/power-supply board 9 which is also shown in FIG. 1, there are provided: a start/stop circuit 9A which gives an instruction of light emission timing to the light emission element 5 and an instruction of count start to a time counter 23, and which gives an instruction of count stop to the time counter 23 on the basis of a light reception signal from the light reception element 13; the time counter 23 which counts time from the timing of start of light emission to the timing of start of light reception; a microcomputer 24 for performing an operation to obtain the distance to a forward vehicle from this counted time, and outputting an alarm control signal to an alarm device (not-shown) if necessary on the basis of this operation result of the distance; and a power supply circuit 25.

Next, the operation will be described. First, receiving a power supply voltage from the power supply circuit 25 such as a battery while the user's vehicle is running, the microcomputer 24 supplies a driving signal for pulse light emission into the driving circuit 21 through the time counter 23 and the start/stop circuit 9A. Accordingly, the light emission element 5 receives a pulse driving current from the driving circuit 21, and emits pulse light. The emitted light is transmitted through the light transmission lens 7 and the glass plate 3 toward a vehicle which is outside the case body 1 and is an object in front of the user's vehicle.

This transmitted light is radiated and reflected on a part of the forward vehicle (or a reflector plate) or the like. The reflected light is incident to the two light reception elements 13 through the glass plate 3 and the light reception lenses 14 in the case body 1 again. This incident signal is amplified by the light reception amplifier 22, so as to actuate the start/stop circuit 9A. Accordingly the counting result of the time counter 23 is put into the microcomputer 24.

In this case, the start/stop circuit 9A establishes the light emission timing when the light emission element 5 is to be driven to emit light by means of the driving circuit 21, detects the light reception timing when the light reception element 13 receives the light, and measures time between the respective timings by means of the time counter 23.

Accordingly, the microcomputer 24 obtains the distance to the forward vehicle, which is an object, on the basis of the time obtained from the time counter 23 and, for example, a relative vehicle speed between the user's vehicle and the forward vehicle, and at the same time, when the distance is smaller than a predetermined value, outputs an alarm control signal, so as to make the alarm device or the like generate an alarm to give warning to the user or the driver.

In such a conventional optical distance measuring equipment, in order to measure the distance to an object in such a manner, the light emission board 4 mounted with the light transmission lens 7 and the light emission element 5, the light reception board 11 mounted with the light reception lenses 14 and the light reception element 13, the operation/ power-supply board 9 and so on are stored or enclosed in the case body 1, as mentioned above, in order to reduce the wiring of the electric system in length and make the connection easy.

However, generally, such a conventional equipment is large in size as a whole, so that when the equipment is mounted onto the front end of a vehicle, it is necessary to take care that the design of the vehicle is not spoilt and an air intake for cooling the engine is not obstructed. In addition, since the glass plate 3 is provided in the front side of the equipment, it is necessary to ensure a space for the installation large enough to prevent the glass plate 3 from colliding with a stone or the like and being broken thereby. However, as a vehicle is made to have multi-functions and be complicated, it has become difficult to ensure the space for the installation.

In addition, since respective parts are disposed in consideration of the wiring of the electric system in such an optical distance measuring equipment, useless dead spaces are formed between the light transmission lens 7 and the glass plate 3 and between the operation/power-supply board 9 and the back cover 2, as shown in the drawing, so that this makes the case body 1 large in size. Accordingly, there has been a problem that it becomes difficult to attach the equipment to the vehicle.

Incidentally, in such an optical distance measuring equipment, the light emission surface thereof has a strip-like shape with an extremely one-sided aspect ratio, and has a forward directivity with a beam divergence angle of several decade degrees. Hereinafter, as a matter of convenience of description, assuming that the direction of narrower width of the light emission surface is called a longitudinal direction, and the direction of wider width is called a transverse direction, typically, the width in the longitudinal direction is approximately several μm while the width in the transverse direction is approximately several hundred μm, approximately a hundred times as large as that in the longitudinal direction. The optical distance measuring equipment is further characterized in that a semiconductor laser diode used therein has a conspicuous difference in the light beam divergence angle between the respective, longitudinal and transverse directions. That is, the typical divergence angle of an emitted light beam is approximately 30° in the longitudinal direction where the width is narrower while approximately 10° in the transverse direction where the width is wider. On the other hand, approximately 100 m ahead, the shape of a desired area to be detected, that is, the shape of a surface to be irradiated by the laser beam can be typically estimated as approximately 8 m in the transverse width almost as wide as the width of a lane, and approximately 4 m in the longitudinal width almost as high as the height of a vehicle. In order that an irradiated surface long from side to side with the aspect ratio approximately 1 to 2 is formed approximately 100 m far away by use of such a semiconductor laser as a light source, it is necessary to provide a special light-transmission optical system in which the compression rate of the beam divergence angle in the longitudinal direction is approximately six times as large as that in the transverse direction.

It can be considered as one candidate of such special light-transmission optical system that a slit shaped into the aspect ratio approximately 1 to 2 is disposed in front of a semiconductor laser diode, as shown in FIG. 3, so that of a light beam, only the portion having a divergence angle not more than approximately 1° to 3° is transmitted. According to this configuration, it is possible to realize a light-transmission optical system extremely easy and inexpensive.

However, in such a light-transmission optical system using merely a slit, since most of the quantity of light emitted from a light source is reflected on the slit or absorbed therein in vain, there is a problem that the quantity of light radiated onto an object is reduced conspicuously, so that the sensitivity of detection is decreased extremely.

If the light-transmission optical system is constituted by a convex lens so that the divergence angles of a light beam in the longitudinal and transverse directions are compressed to a value of several degrees, the quantity of emitted light can be used effectively, and the problem in the case of only a slit can be solved. However, since the desired compression rate of the divergence angle in the longitudinal direction is different from and approximately six times as large as that in the transverse direction, it is necessary to provide a special combination lens system for realizing the different compression rates in the longitudinal and transverse directions. Such a combination lens system can be realized by the combination of plane convex cylindrical lenses 151 and 152 for respectively compressing the divergence angles of a beam in the longitudinal and transverse directions by compression rates different from each other, as shown in FIG. 4(A).

In order to simplify a holding mechanism of the lens system in FIG. 4(A), preferably the flat surfaces of the plane convex cylindrical lenses 151 and 152 are joined with each other by an adhesive so that the both are integrated with each other, as shown in FIG. 4(B). Further, preferably, as shown in FIG. 4(C), the cylindrical lenses 151 and 152 are formed integrally by the injection molding of light transmissive resin as material, so that it is not only possible to avoid the reflection loss of laser light produced on the joint surface of the both lenses and the deterioration of optical characteristics accompanying with the separation thereof, but it is also possible to reduce the labor of assembling.

In the integrated structure of cylindrical lenses formed by the injection molding of light transmissive resin as shown in FIG. 4(C), there are various advantages as mentioned above. However, in this integrated structure, the thickness is increased as a whole, so that there is a problem that it is difficult to ensure a high accuracy of the shape. First, it will be described the reason why the thickness of cylindrical lenses having an integrated structure is increased. Assume that in the cylindrical lenses having an integrated structure, the thickness of a flat portion is zero as shown in the perspective view of FIG. 5(A), and as a matter of convenience of description, respective focal lengths, that is, respective curvatures of curved surfaces are equal to each other. FIGS. 5(B) and 5(C) show the longitudinal and transverse sectional views including their optical axes respectively. According to the cylindrical lenses having an integrated structure as shown in FIGS. 5(A) to 5(C), since the compression rates of the divergence angles of a light beam in the longitudinal and transverse directions are equal to each other, these lenses can be replaced by an optical equivalent plane convex lens. FIGS. 6(A) to 6(C) show the perspective view and longitudinal and transverse sectional views of such an optical equivalent plane convex lens respectively.

By the comparison between FIGS. 5(A) and 5(B) and FIGS. 6(A) and 6(B), it can be understood that the whole thickness of the cylindrical lenses having an integrated structure is twice as large as the thickness of the plane convex lens. This is because the respective curved surfaces for compressing the divergence angles of a light beam in the longitudinal and transverse directions are formed in a common space in the case of the plane convex lens while such curved surfaces are formed in separate spaces in the case of the cylindrical lenses having an integrated structure. This also applies to the case of practical cylindrical lenses having an integrated structure and being different in curvature of curved surface, that is, in thickness from each other.

In the case where the cylindrical lenses having an integrated structure as shown in FIGS. 5(A) to 5(C) are formed by injection molding, as the thickness increases, it becomes extremely difficult to ensure the accuracy of the shape. The reasons for this will be described below. As is well known, injection molding is performed by charging high-temperature melting resin into a metal mold under a given pressure, cooling and solidifying this charged resin. This cooling is performed through radiating heat from the high-temperature resin to the metal mold. Therefore, the temperature of the peripheral portion of the resin contacting with the metal mold decreases first, and the cooling and solidification gradually advance from this peripheral portion toward the inside. A large thermal stress and a large thermal distortion are produced in the accompanying with thermal contraction at the time of this cooling, causing the deterioration of the accuracy of a final shape. Such deterioration of the accuracy of the shape gets conspicuous as increased is the difference in temperature between the peripheral portion and center portion of the resin being solidified, that is, as increased are the anisotropy and thickness of the shape. Thus, in a lens of which the shape has a large anisotropy, if the thickness gets large, thermal distortion is produced on the way of solidification, so that there is a problem that the shape accuracy of the curved surface is reduced on a large scale, or a crack is produced in the case of extreme distortion, so that it is substantially impossible to form a practical lens.

On the other hand, it can be considered that the optimum detection area of an optical distance measuring equipment has such a rectangular shape long from side to side that the transverse width is approximately 8 m, as large as the width of a lane, and the longitudinal width is approximately 4 m, as large as the maximum height of a vehicle, in a far position of approximately 100 m, as mentioned above. In an optical distance measuring equipment, if the detection area is larger than this, disadvantageously light reflected from a vehicle on an adjacent lane and unnecessary to be detected is detected. Therefore, as shown in FIG. 7, the shape of a light reception surface 162 on which the light reflected on this detection area is focused by a convex lens 161 must has a rectangular shape long from side to side with an aspect ratio of approximately 1 to 2 (h:w=1:2), which is similar to the detection area.

Conventionally, the shape of a generalized light reception element such as an avalanche photodiode (APD) is circular. Therefore, in order that only an image which is in the detection area is focused on a light reception surface by using a light reception lens, it is necessary that a slit with an opening portion having a shape which is long from side to side and which has an aspect ratio of approximately 1 to 2, similarly to the detection area, is provided as close to the light reception surface of the APD as possible. For example, as shown in FIG. 8, a slit 112 having an opening portion 112a long from side to side and having almost the same aspect ratio as the detection area must be bonded and fixed onto a light reception surface 111 of the APD.

In the light reception element combined with the slit shown in FIG. 8, of the light reception surface of the APD, most of the peripheral portion becomes a useless area not to contribute to the operation of photoelectric conversion. Such a useless area is not only useless in the cost of manufacturing, the power consumption and so on, but there is also a problem that the useless area reduces the yield at the time of manufacturing, or the joint capacitance deteriorates the operation of the element or decreases the reliability of the element as a whole.

SUMMARY OF THE INVENTION

It is therefore an object of the present invention to solve the foregoing problems.

It is another object of the present invention to provide an optical distance measuring equipment in which the distance between a light emission element and a light transmission lens and the distance between a light reception element and a light reception lens are approximately constant, so that it is possible to measure distance to an object accurately on the basis of optical distance data for the object.

It is another object of the present invention to provide a light transmission lens so small in thickness as to be integrated with a laser head or the like by injection molding of light transmissive resin.

It is a further object of the present invention to provide a light reception element of an optical distance measuring equipment by which it is not only possible to reduce the cost of manufacturing and the power consumption, but it is also possible to improve the yield at the time of manufacturing, the speed of operation, and the reliability of the element as a whole.

The invention provides an optical distance measuring equipment in which light from a light emission element is transmitted to an object through a light transmission lens, and light reflected on the object is received by a light reception element through a light reception lens so that a distance to the object is measured on the basis of light transmitting timing and light receiving timing, including: a light emission/reception board on which the light emission element and the light reception element are installed; and a lens holding member which is disposed in front of the light emission/reception board, whereby the light transmission lens and the light reception lens are installed substantially at the same distance from the light emission element and the light reception element respectively.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 9 is a plan sectional view illustrating an embodiment of an optical distance measuring equipment according to the present invention;

FIG. 16 is a sectional view for explaining an example of a design which relates to the compression of a divergence angle of a light beam in the vertical direction by the laser head in FIG. 15;

FIG. 17 is a sectional view for explaining an example of a design which relates to the compression of a divergence angle of a light beam in the horizontal direction by the laser head in FIG. 15;

DETAILED DESCRIPTION OF THE PREFERRED EMBODIMENTS

Figure 1:
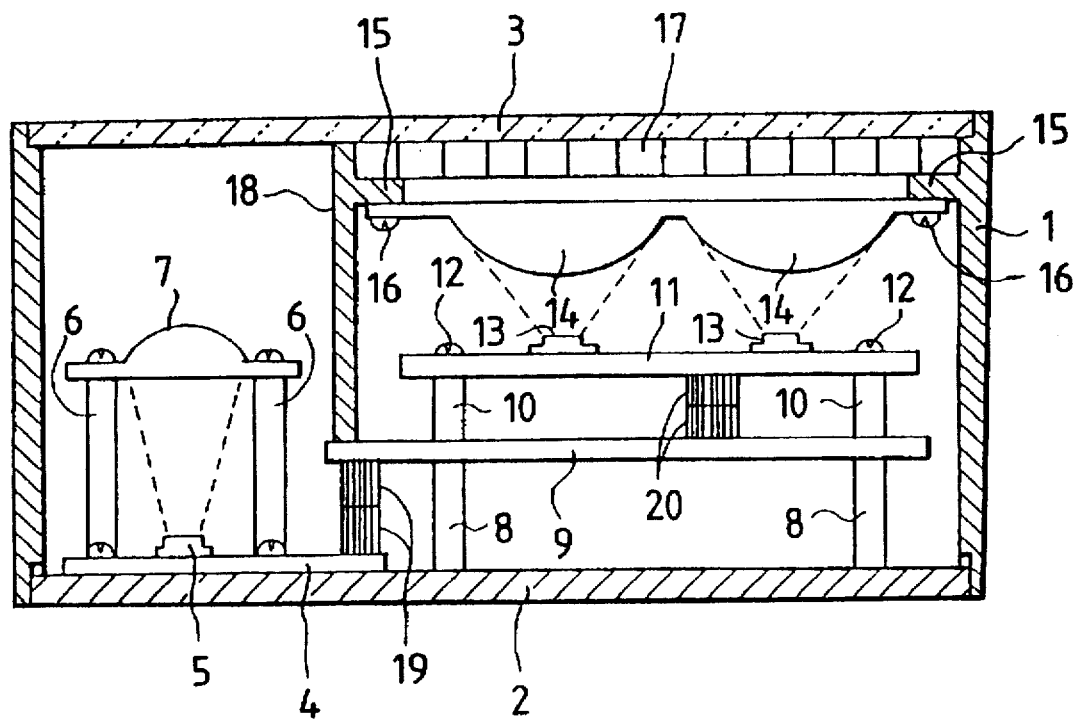
FIG. 1 is a plan sectional view illustrating a conventional optical distance measuring equipment.
Figure 2:
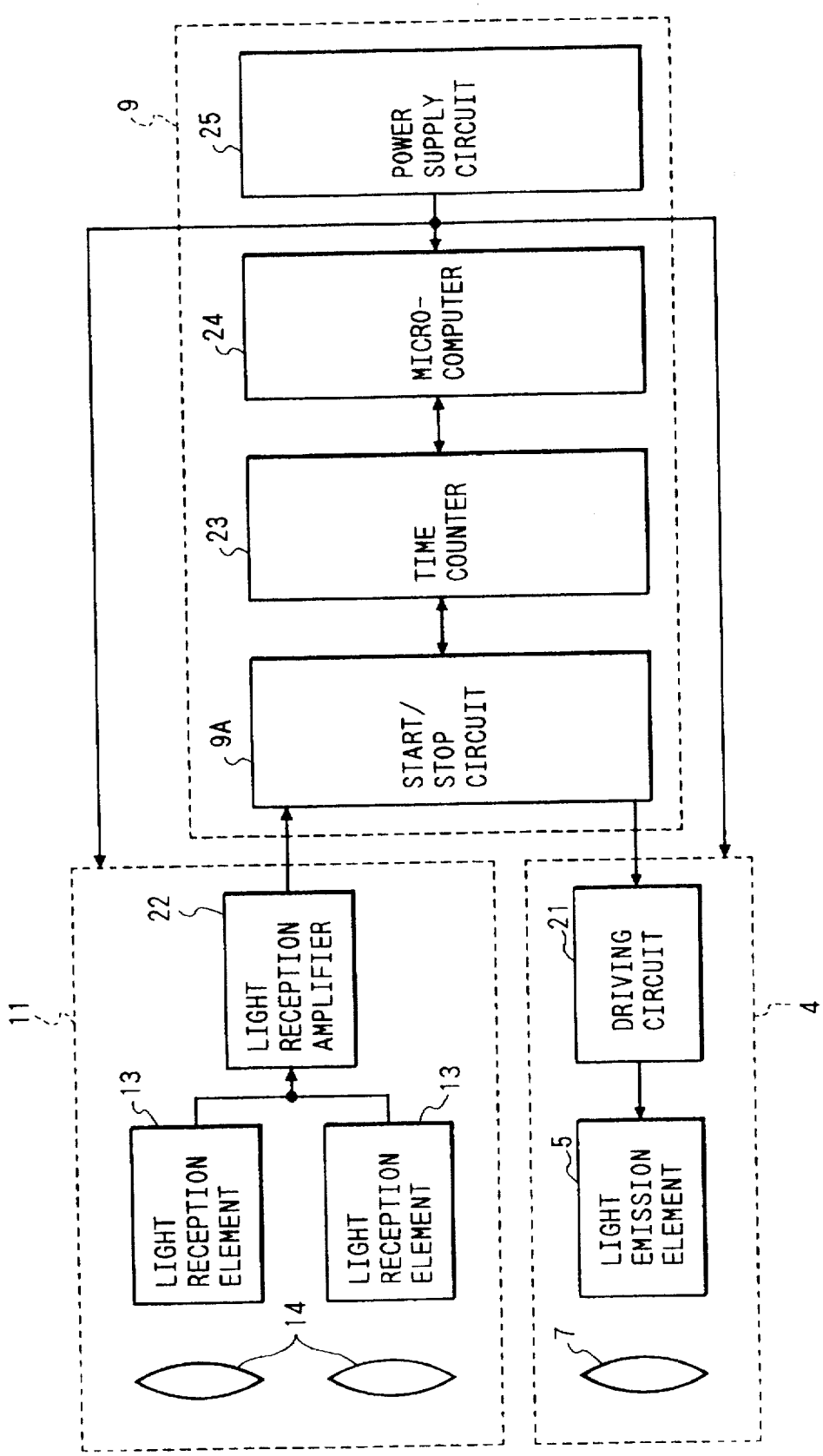
FIG. 2 is a block diagram illustrating a photoelectric circuit of the optical distance measuring equipment in FIG. 1.
Figure 3:
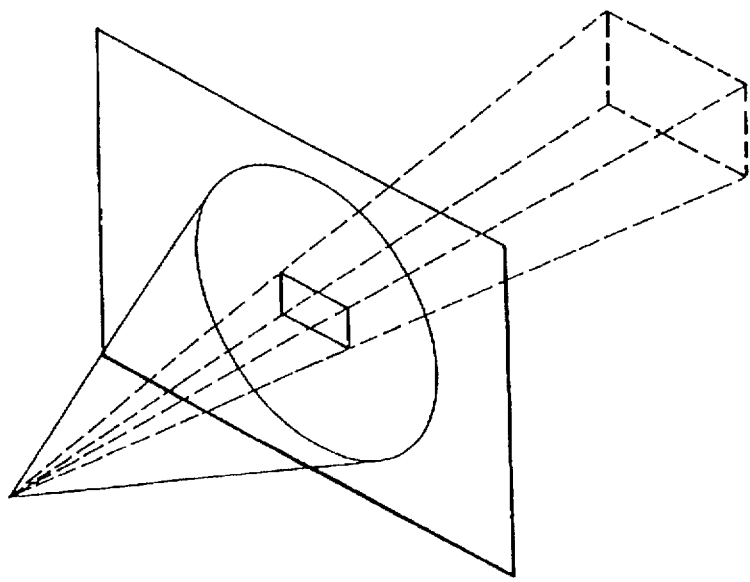
FIG. 3 is a perspective view for explaining an example of the structure of a light transmission optical system of a laser head constituted only by a slit.
Figure 4A:
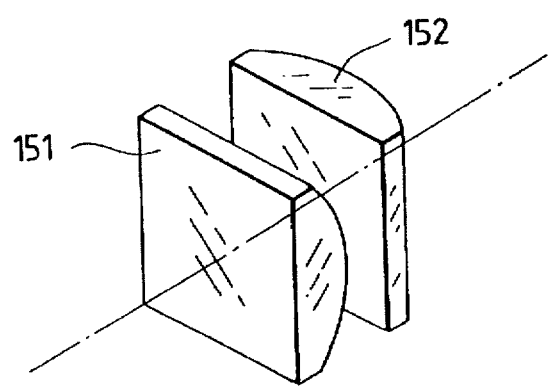
FIGS. 4(A) to 4(C) are perspective views for explaining examples of the structure of a light transmission lens system of a laser head constituted by the combination of two cylindrical lenses.
Figure 4B:
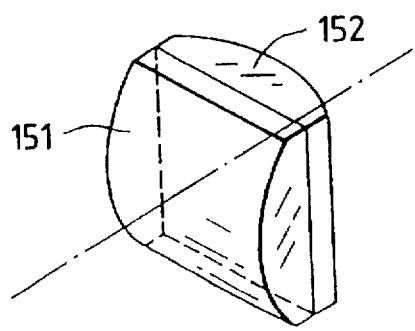
Figure 4C:
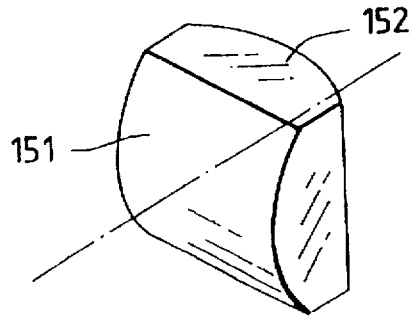
Figures 5A, 5B, 5C:
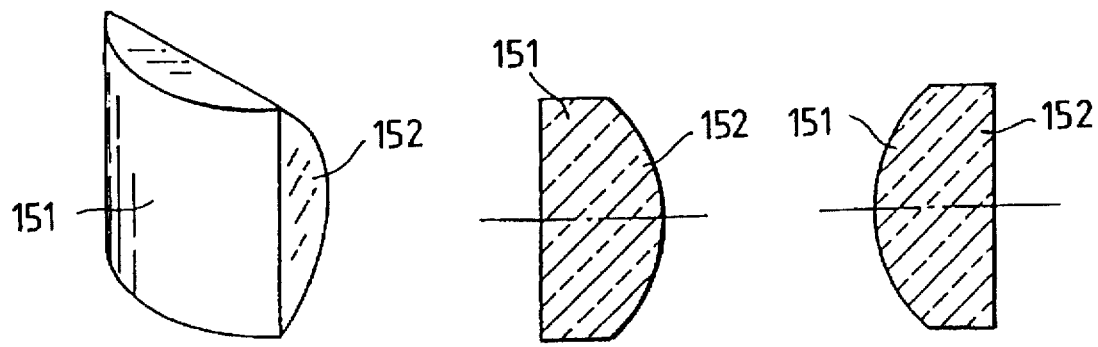
FIGS. 5(A) to 5(C) are a perspective view and sectional views for explaining the thickness of a light transmission lens system constituted by the combination of two cylindrical lenses.
Figures 6A, 6B, 6C:
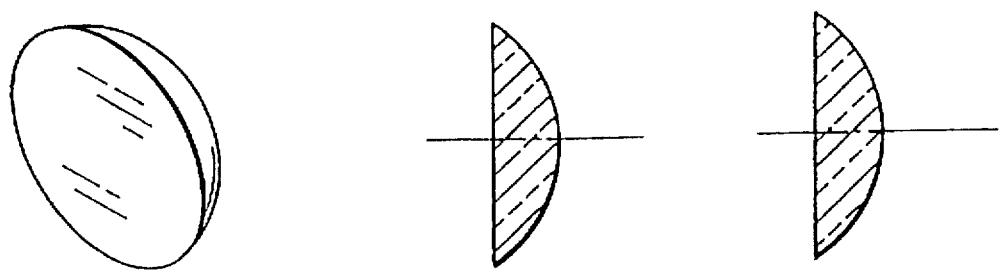
FIGS. 6(A) to 6(C) are a perspective view and sectional views for explaining the thickness of a light transmission lens system constituted by a plane convex lens in comparison with the case of the combination of two cylindrical lenses.
Figure 8:
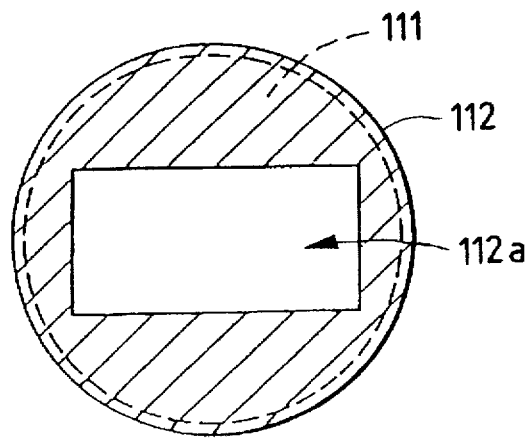
FIG. 8 is a plan view illustrating the structure of a light reception element of a conventional optical distance measuring equipment.
Figure 7:
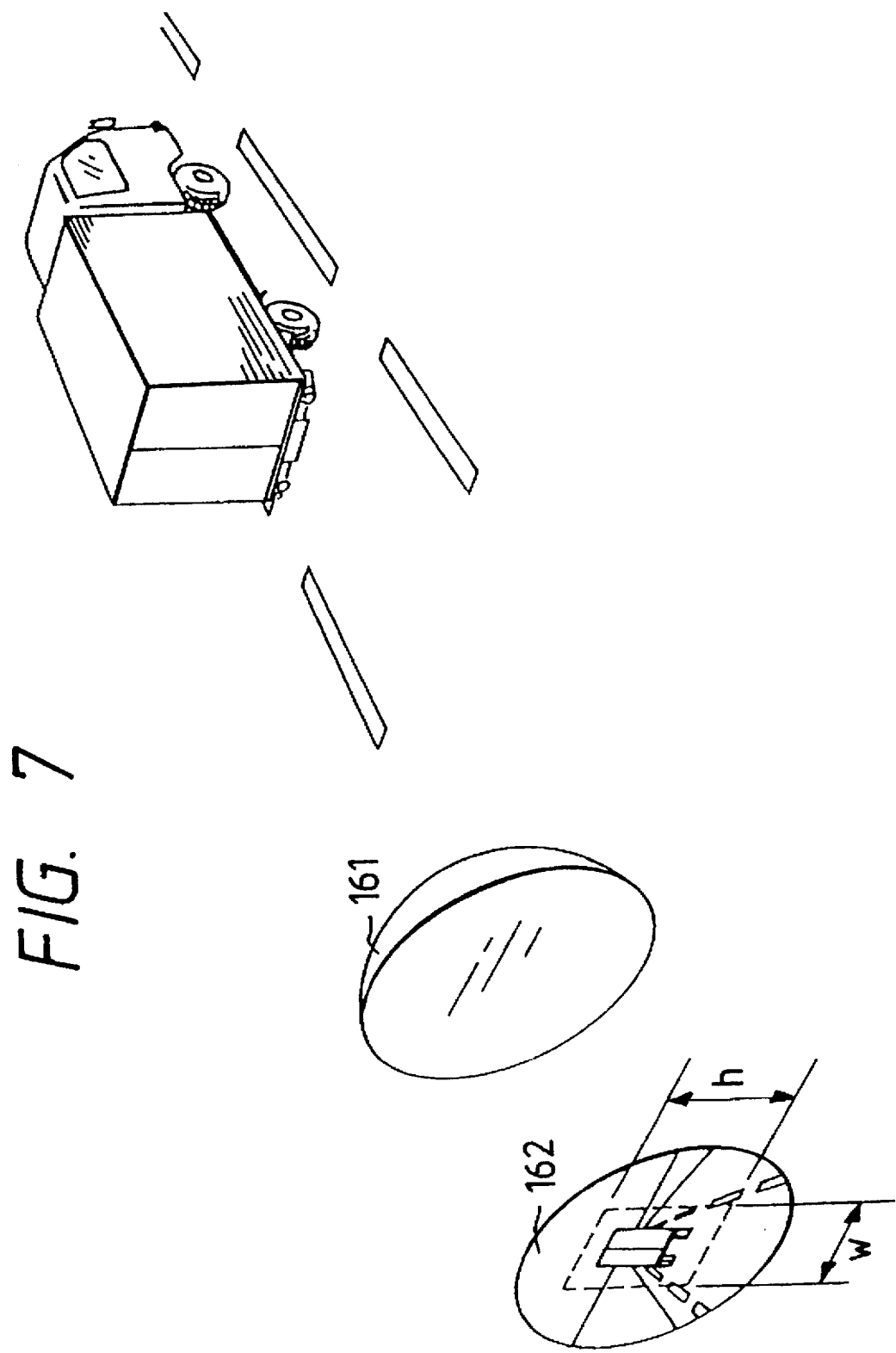
FIG. 7 is a conceptual diagram for explaining a detection area of an optical distance measuring equipment.

An embodiment of an optical distance measuring equipment according to the present invention will be described with reference to the drawings. In FIG. 9, reference numeral 31 designates a case body in which a glass plate 32 as a light transmission plate is attached to one opening portion so that the inside is sealed with water tightness. Reference numeral 33 designates a lens holding member constituted by plastic or metal members. The end portions of the lens holding member 33 are supported by mounting pieces 34 and step portions 35 provided and projecting at the four corners of the inner wall of the case body 31 near the glass plate 32.

A through-hole 36 for transmitting and passing light is provided on the left side of the lens holding member 33 integrally, and a ring-like hood portion 37 extended forward and a conical light shield portion 38 extended backward are provided on the right side integrally. Further, on the right side of the hood portion 37, an optical axis mirror mounting portion 39 is provided integrally.

Reference numeral 40 designates a light transmission lens attached onto the lens holding member 33 by a screw 41 so as to close the through-hole 36, and 42 designates a light reception lens attached to a base portion inside the hood portion 37 in the lens holding member 34 so as to be disposed substantially in the same level as the light transmission lens 40.

Reference numeral 43 designates a light interference filter inserted to an opening end (front end) of the hood portion 37, and 44 designates an optical axis mirror attached to the optical axis mirror mounting portion 39 by a screw 45. The optical axis mirror 44 is used for adjusting an optical axis when the equipment body is installed on a vehicle.

Reference numeral 46 designates a stain detecting sensor provided in the lens holding member 33 so as not to close a photometric path of the light transmission lens 40 and so as to be opposite to the glass plate 32. The stain detecting sensor 46 is to detect the state of a stain on the glass plate 32, and to output a signal for calling attention to cleaning.

Reference numerals 47 and 48 represent long and short mounting bosses integrally provided and projecting in a plurality of places on the back surface of the lens holding member 33; 49, an operation board provided at the rear of the mounting boss 48; and 50, a stud screwed down into a screw hole 52 of the mounting boss 48 through inserting a screw portion 51 on the top end into a mounting hole (not-shown) provided in the operation board 49, so as to hold the operation board 49.

Reference numeral 53 designates a light emission/reception board installed at the rear of the stud 50, and 54 designates a stud screwed down into a bush 56 through inserting a screw portion 55 on the top end into a mounting hole (not-shown) provided in the light emission/reception board 53, so as to hold the light emission/reception board 53.

Reference numeral 57 designates a power supply board installed at the rear of the stud 54, and 58 designates a screw screwed down into a screw hole 59 of the stud 54 through a mounting hole (not-shown) provided in the power supply board 57, so as to fix the power supply board 57 to the stud 54. Further, part of the power supply board 57 is fixed at the top end of the long boss 47 through a screw 60.

In such a manner, the operation board 49, the light emission/reception board 53 and the power supply board 57 are installed integrally with the holding member 33 by the mounting bosses 47 and 48 and the studs 50 and 54.

The light emission/reception board 53 is sectioned and mounted with a light emission element 61 such as a semiconductor laser diode or the like, a light emission circuit including a driving circuit of the light emission element 61, a light reception element 62, and a light reception circuit including a light reception amplifier, as well as a printed connection pattern. A shield heat-radiation case 63 in which synthetic resin 63a superior in heat conductivity is molded is attached to the rear surface (back surface) of the light emission/reception board 53 near the light emission element 61. A part (nail or the like) of the peripheral edge of the shield heat-radiation case 63 projects upward through a mounting hole provided in the light emission/reception board 53, so that the shield heat-radiation case 63 is thermally connected with the light emission element 61 through synthetic resin 63a similar to the above-mentioned resin and flowed on the light emission/reception board 53. The respective synthetic resins 63a on the upper and lower surfaces of the light emission/reception board 53 are integrated with each other through an injection hole 53a provided in the light emission/reception board 53.

Reference numeral 64 designates a through-hole for transmitting light and for forming a photometric path. The through-hole 64 is provided in the operation board 49 positioned in front of the light emission/reception board 53. The through-hole 64 is formed into a predetermined size on an optical axis of the light emission element 61. A photodiode 65 for monitoring light L outside the photometric path running through the through-hole 64 from the light emission element 61, and detecting whether the light emission element 61 operates normally or not. The diameter of the through-hole 64 is established so as to transmit light (angle θ) illuminating the neighborhood of the light transmission lens 40 as well as light (angle θ) used effectively for photometry.

Reference numeral 66 designates a transmission hole for transmitting reflected light. The transmission hole 66 is provided in the operation board 49. The transmission hole 66 is disposed in the place corresponding to the light reception element 62. A transmission hole 67 at the small-diameter end of the conical light shield portion 38 is fitted to the outer periphery of the light reception element 62, so that light emitted from the light emission element 61 is prevented from being reflected on the inside of the case body 31 and being directly incident to the light reception element 62.

Although two photodiodes having insufficient sensitivity are provided in parallel as the light reception element 62 in convention, one avalanche photodiode superior in light reception sensitivity is used herein.

A start/stop circuit for determining the timing of light transmission and the timing of light reception is provided on a part of the light emission/reception board 53, for example, in the intermediate position thereof. On the other hand, the operation board 49 has a counter circuit for measuring time from the timing of light transmission to the timing of light reception established and detected under the control of the start/stop circuit, and a microcomputer for performing an operation for obtaining distance to an object such as a forward vehicle on the basis of the measuring result of the counter circuit, as well as a printed connection pattern and so on. The operation board 49 is mounted with only the microcomputer and its peripheral circuits relating to operation processing. Accordingly, there is not any other circuit function, so that it is possible to draw a complicated and desired connection pattern, to thereby make the design easy.

Reference numeral 68 designates a power supply transformer provided on the power supply board 57 and disposed among one end portion of the light emission/reception board 53, one end portion of the operation board 49 and one side plate of the case body 31. The power supply transformer 68 supplies power supply voltages to the respective circuits on the light emission/reception board 53 and the operation board 49, and at the same time supplies a high power supply voltage to the light reception element 62 which is an avalanche photodiode. Reference numeral 70 designates a line extraction portion having a water-tight structure and used for extracting measured distance data to the outside and for other usage.

Figure 10:
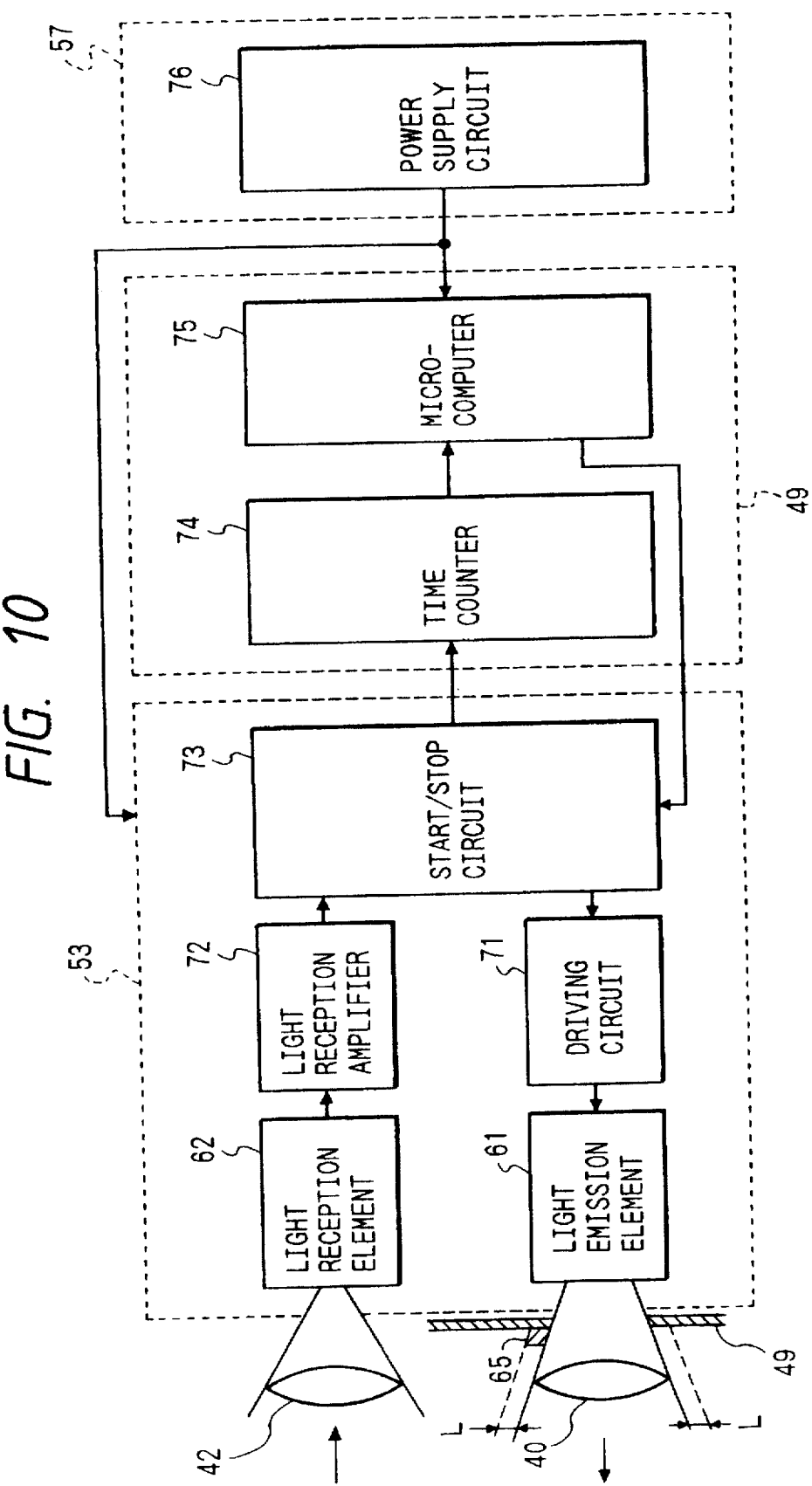
FIG. 10 is a block diagram illustrating a photoelectric circuit of the optical distance measuring equipment in FIG. 9.

FIG. 10 is a block diagram illustrating a photoelectric circuit of the optical distance measuring equipment. In FIG. 10, the light emission/reception board 53 is mounted with the light emission element 61, a driving circuit 71 for driving the light emission element 61, the light reception element 62, a light reception amplifier 72 for amplifying the light reception output thereof, and a start/stop circuit 73 for establishing and detecting the above-mentioned timings of light transmission and light reception.

The operation board 49 is mounted with a time counter 74 for receiving information of the timings of light transmission and light reception, and measuring time between both the timings, and a microcomputer 75 for performing an operation for obtaining distance to an object on the basis of the measuring result of the time counter 74. Reference numeral 76 designates a power supply circuit including the power supply transformer 68 and provided on the power supply board 57.

Next, the operation will be described on vehicle collision prevention by way of example. First, during the running of a user's vehicle, receiving a power supply voltage from the power supply circuit 76, the microcomputer 75 puts a driving signal into the driving circuit 71 through the start/stop circuit 73 for the sake of light emission. The light emission element 61 receives a driving current from the driving circuit 71, to thereby emit light. The emitted light is transmitted through the light transmission lens 40 and the glass plate 32 toward a vehicle which is an object outside the case body 31 and in front of the user's vehicle.

This transmitted light is radiated and reflected on a part (or reflector plate) of the vehicle or the like. The reflected light passes through the glass plate 32 again, and is incident to the light reception element 62 through the light reception lens 42 in the case body 31. This incident signal is amplified by the light reception amplifier 72, and thereafter put into the microcomputer 75 through the start/stop circuit 73 and the time counter 74.

In this case, the start/stop circuit 73 establishes and detects the timing when the driving circuit 71 makes the light emission element 61 emit light and the timing when the light reception element 62 receives the light, and the time counter 74 measures time between the respective timings.

Accordingly, the microcomputer 75 obtains distance to the forward vehicle from the time obtained from the time counter 74, and outputs a control signal if necessary so as to actuate an alarm circuit when the obtained distance is not more than a predetermined value.

Since the start/stop circuit 73 is installed on the side of the light emission/reception board 53 in this embodiment, it is possible to detect the light emission timing of the light emission element 61 and the light reception timing of the light reception element 62 accurately without any influence from line delay. This contributes largely to the improvement of accuracy of distance measurement.

In such an optical distance measuring equipment, in the case of measuring distance in such a manner, only if the lens holding member 33 and the light emission/reception board 53 are installed in predetermined positions in the case body 31, not only the position of the light transmission lens 40 relative to the light emission element 61 and the position of the light reception lens 42 relative to the light reception element 62 but also the mutual position relationship of these can be kept constant. Accordingly, there is not any scattering in optical axis length, so that it is possible to give a high accuracy to the distance detection result of an object.

In addition, a dead space between the lens holding member 33 and the light emission/reception board 53 can be used effectively by inserting thereto the through-hole 64 for forming a photometric path or the like restricted in a predetermined area, or the operation board 49 having an operation circuit.

Further, since the power supply board 57 is mounted with the power supply transformer 68 disposed at the rear of the light emission/reception board 53 and at the side of the light emission/reception board 53 and the operation board 49, it is possible to store the power supply transformer 68 in the position where the power supply transformer 68 is not in the way of the installation of the light emission/reception board 53, the operation board 49 and the power supply board 57.

In addition, the synthetic resin 63a having a high heat conductivity is charged in advance into the shield heat-radiation case 63 attached to the back surface of the light emission/reception board 53 through the injection hole 53a provided in the light emission/reception board 53. Accordingly, it is possible to transfer the heat of the light emission element 61 to the shield heat-radiation case 63 through the synthetic resin 63a flowed onto the upper surface of the light emission/reception board 53 so as to cover the outer periphery of the light emission element 61 and the similar synthetic resin 63a in the shield heat-radiation case 63 so that it is possible to perform heat exchange between the shield heat-radiation case 63 and the atmosphere contacting with the surface thereof.

In addition, the photodiode 65 for detecting light outside the photometric path is provided near the through-hole 64 on the light transmission side in the operation board 49. If light from the light emission element 61 is caught by this photodiode 65 and the output of the photodiode 65 is monitored, it is possible to judge whether the operation of the light emission/reception element 61 is normal or not.

Further, the mounting bosses 47 and 48 for fixing the light emission/reception board 53, the operation board 49 and the power supply board 57 through the bushes 50 and 54 respectively are provided integrally in the lens holding member 33 for holding the light transmission lens 40 and the light reception lens 42. Accordingly, it is possible to install optical distance measuring parts onto the case body 31 as a whole and easily in the state where the light emission/reception board 53, the operation board 49 and the power supply board 57 are integrally coupled with the lens holding member 33.

A light emission circuit and a light reception circuit are mounted on one and the same light emission/reception board 53. Near the light emission/reception board 53, the operation board 49 having the microcomputer 75 as an operation circuit for performing an operation for obtaining distance to an object is provided between the light emission/reception board 53 and the lens holding member 33 mounted with the light transmission lens 40 and the light reception lens 42 which are on the substantially same level. Further, the power supply board 57 is disposed at the rear of the light emission/ reception board 53. By such a configuration, it is possible to reduce the width and depth of the case body 31 storing these, so that it is possible to miniaturize the whole shape. Accordingly, it is possible to ensure an occupied space for mounting the case body 31 on a vehicle.

Further, in the present invention, only one side of the case body 31 has an opening portion, and the glass plate 32 is attached to the opening portion with water tightness. Accordingly, it is possible to more improve the water tightness inside the case body 31 in comparison with that which has a back cover as in convention.

Although in the above-mentioned embodiments, the distance to a forward vehicle is obtained in order to prevent a user's vehicle from dashing thereto, the present invention is not limited in this, and can be applied to distance measurement between any moving bodies broadly.

As has been described, a lens holding member mounted with a light transmission lens and a light reception lens substantially at the same distance relative to a light emission element and a light reception element respectively is provided in front of a light emission/reception board mounted with the light emission element and the light reception element. By such a configuration, the distance between the light emission element and the light transmission lens and the distance between the light reception element and the light reception lens are made approximately constant, so that there is an effect that the distance to an object can be measured accurately on the basis of optical distance data to the object.

Figure 11A:
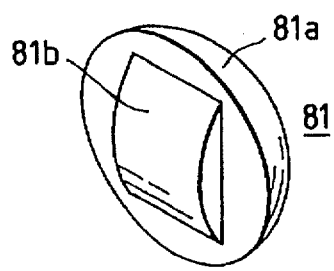
FIGS. 11(A) to 11(C) are a perspective view, transverse sectional view and longitudinal sectional view respectively illustrating an embodiment of a light transmission lens of a laser head according to the present invention.
Figure 11B:
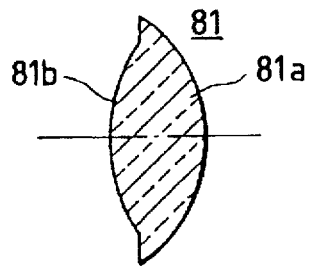
Figure 11C:
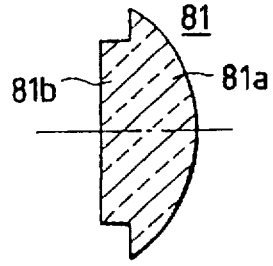
Figure 15:
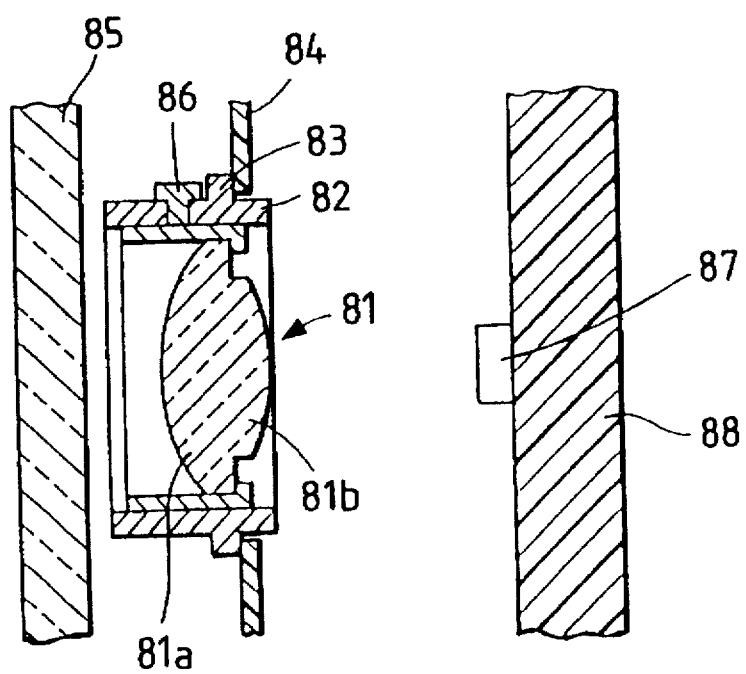
FIG. 15 is a sectional view illustrating an example of the structure of a laser head using the light transmission lens in FIG. 14.

FIGS. 11(A) to 11(C) are a perspective view and sectional views illustrating an embodiment of a light transmission lens of a laser head according to the present invention. FIG. 11(B) is a longitudinal sectional view taken on a vertical plane including an optical axis, and FIG. 11(C) is a transverse sectional view taken on a horizontal plane including the optical axis. This light transmission lens is constituted by a plane convex lens 81a and a plane convex cylindrical lens 81b, which are formed integrally by injection molding by use of light transmissive resin as material so that their flat surfaces are made common. The light transmission lens in this embodiment can be applied to the above-mentioned optical distance measuring equipment. For example, the light transmission lens can be also installed in a laser head of an optical distance measuring equipment as shown in FIG. 15.

Different divergence angles in the longitudinal and transverse directions of a light beam radiated from a semiconductor laser are compressed in the longitudinal and transverse directions by an equal scale factor by the plane convex lens 81a. In the case of the example of use in FIG. 15, the compression rate of the plane convex lens 81a is established to a value by which the divergence angle of approximately 10° in the transverse direction of a light beam can be compressed into an aimed value of approximately several degrees. The compression of the divergence angle in the transverse direction is attained only by the plane convex lens 81a. In this case, the compression rate by only the plane convex lens 81a is insufficient to compress the divergence angle of approximately 30° in the longitudinal direction larger than that in the transverse direction. The shortage of the compression rate is made up with the plane convex cylindrical lens 81b compressing only in the longitudinal direction.

Figure 12A:
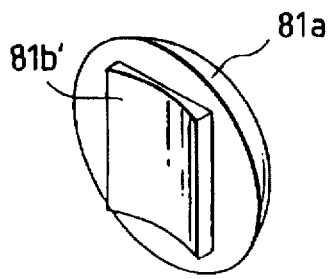
FIGS. 12(A) to 12(C) are a perspective view, transverse sectional view and longitudinal sectional view respectively illustrating the structure of a light transmission lens according to another embodiment of the present invention.
Figure 12B:
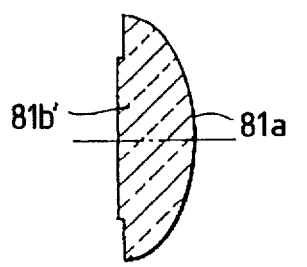
Figure 12C:
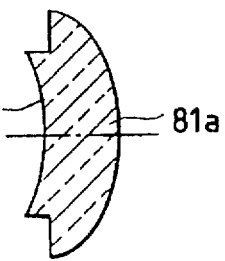

FIGS. 12(A) to 12(C) are a perspective view, longitudinal sectional view and transverse sectional view respectively illustrating the structure of a light transmission lens according to another embodiment of the present invention. This light transmission lens is constituted by a plane convex lens 81a and a plane concave cylindrical lens 81b', which are formed integrally by injection molding by use of light transmissive resin as material so that their flat surfaces are made common. For example, the light transmission lens in this embodiment is installed in the laser head as shown in FIG. 15.

According to the embodiment in FIGS. 12(A) to 12(C), the compression rate of the plane convex lens 81a is established to a value by which the divergence angle of approximately 30° in the longitudinal direction of a light beam can be compressed into an aimed value of approximately several degrees. The compression of the divergence angle in the longitudinal direction is attained only by the plane convex lens 81a. In this case, the compression rate only by the plane convex lens 81a is excessive to compress the divergence angle of approximately 10° in the transverse direction smaller than that in the longitudinal direction. The excess of the compression rate is corrected with the plane concave cylindrical lens 81b' expanding the divergence angle only in the longitudinal direction, so that the divergence angle of approximately several degrees can be finally obtained.

Figure 13A:
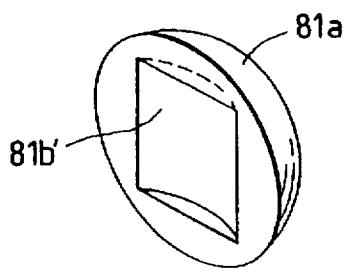
FIGS. 13(A) to 13(C) are a perspective view, transverse sectional view and longitudinal sectional view respectively illustrating the structure of a light transmission lens according to a further embodiment of the present invention.
Figure 13B:
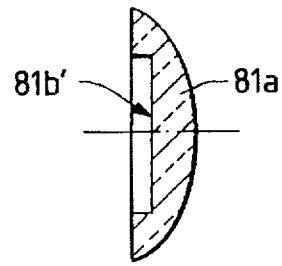
Figure 13C:
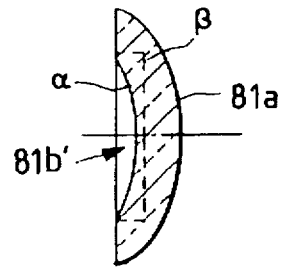

FIGS. 13(A) to 13(C) are a perspective view, longitudinal sectional view and transverse sectional view respectively illustrating the structure of a light transmission lens according to a further embodiment of the present invention. This light transmission lens is constituted by a plane convex lens 81a and a plane concave cylindrical lens 81b', which are formed integrally by injection molding by use of light transmissive resin as material so that their flat surfaces α and β intersect with each other in the optical axis direction. According to this embodiment, the thickness of the combination lens becomes the minimum. The optical effect of the light transmission lens is the same as that in the above-mentioned case of FIGS. 12(A) to 12(c).

Figure 14:
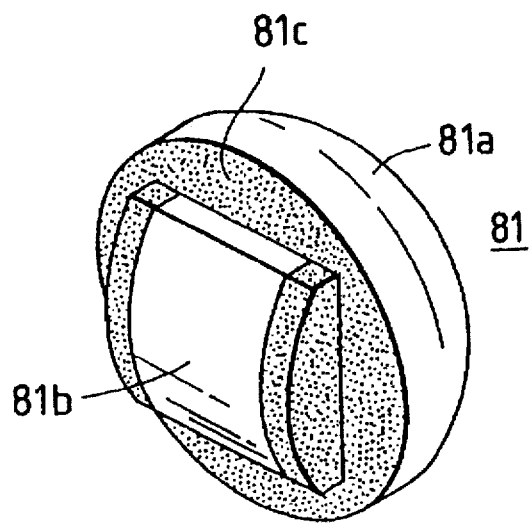
FIG. 14 is a perspective view illustrating the structure of a light transmission lens according to a still further embodiment of the present invention.

FIG. 14 is a perspective view illustrating the structure of a light transmission lens according to a still further embodiment of the present invention. This light transmission lens is constituted by a plane convex lens 81a and a plane convex cylindrical lens 81b, which are formed integrally by injection molding by use of light transmissive resin as material so that their flat surfaces are made common, and a slit 81c is provided so that a light absorbing layer is formed in the peripheral portion of the curved surface of the plane convex cylindrical lens 81b by screen printing. As mentioned above, the plane convex cylindrical lens 81b is for compensation. Therefore, the curvature of the curved surface thereof is so gentle that the screen printing onto the curved surface can be performed easily and surely.

FIG. 15 is a sectional view illustrating an example of the structure of a main portion of a laser head of an optical distance measuring equipment using the integrated light transmission lens 81 shown in FIG. 14. The integrated light transmission lens 81 constituted by the plane convex lens 81a and the plane convex cylindrical lens 81b is held in an internal lens holder 82, and the inner lens holder 82 is held in an external lens holder 83. The external lens holder 83 is held by a frame 84. The internal lens holder 82 is held movably forward/backward in the optical axis direction inside the external lens holder 83, and the terminal position thereof is defined by a stopper screw 86. A protective glass 85 is disposed in front of the external lens holder 83. A semiconductor laser diode 87 stored in a case mounted on a printed wiring board 88 is disposed at the rear of the light transmission lens 81.

Next, an example of the design of the laser head in FIG. 15 will be described. Assume that the divergence angles of a beam of a semiconductor laser diode are 30° in the vertical direction and 10° in the horizontal direction, and these divergence angles are compressed to approximately 1.7° in the vertical direction and approximately 2.7° in the horizontal direction, so that an irradiation surface long from side to side with an aspect ratio of approximately 1 to 2 is formed in front of the head. An example of design which will be described later is a final one obtained through trial and error repeated many times, and includes the cases where various constants or variables take values around values decided finally.

First, the formation of a beam in the vertical direction will be described. Upon the element plane convex lens 81a, the element plane convex cylindrical lens 81b and the light transmission lens 81 constituted by those lenses 81a and 81b in combination, respective constants and variables as shown in FIG. 16 are defined as follow:

$f_1$ :focal length of the plane convex lens 81a (let it be 40 mm)

$f_2$ :focal length of the plane convex cylindrical lens 81b (let it be 120 mm)

a :distance from a second main point of the plane convex lens 81a to a light emission surface S (let it be 33 mm)

d :distance from the second main point of the plane convex lens 81a to a first main point of the plane convex cylindrical lens 81b (let it be 8.1 mm)

t :distance from the first main point of the plane convex cylindrical lens 81b to a second main point thereof (let it be 1.5 mm)

z :distance from the second main point of the plane convex cylindrical lens 81b to a second main point of the combination lens f :focal length of the light transmission lens 81 obtained by combination a' :distance to the light emission surface S from a second main point of the light transmission lens 81 obtained by combination b' :distance to an image of the light emission surface S from the second main point of the light transmission lens 81 obtained by combination θv :half a divergence angle of a light beam in the vertical direction (30°/2=15°)

θv' :a divergence angle of a light beam passing through the light transmission lens 81 obtained by combination (half angle)

If $f_1$=40 mm, $f_2$=140 mm and d=8.1 mm are substituted into the relationship expression between the focal lengths $f_1$ and $f_2$ of the respective element lenses 81a and 81b and the focal length f of the combined lens 81, the combined focal length f can be obtained as follows:

$$f = (f_1 \cdot f_2)/(f_1 + f_2 - d) \quad (1)$$
$$= (40 \cdot 120)/(40 + 120 - 8.1)$$
$$= 31.6 \text{ mm}$$

Next, the distance z from the second main point of the plane convex cylindrical lens 81b to the second main point of the combined lens 81 can be expressed by:

$$z = f - f_2(f_1 - d)/(f_1 + f_2 - d) \quad (2)$$
$$= 31.6 - 120(40 - 8.1)/(40 + 120 - 8.1)$$
$$= 6.4 \text{ mm}$$

Let the distance a from the second main point of the plane convex lens 81a to the light emission surface S be 33 mm, and the distance t from the first main point of the plane convex cylindrical lens 81b to the second main point thereof be 1.5 mm. The distance a' to the light emission surface S from the second main point of the light transmission lens 81 obtained by combination can be expressed by:

$$a' = a - d + z - t \quad (3)$$
$$= 33 - 8.1 + 6.4 - 1.5$$
$$= 29.8 \text{ mm}$$

Upon the focal length f of the combined light transmission lens 81, the position of the light emission surface S of a semiconductor laser diode, and the divergence angle of a light beam, the following equations are established.

$$1/f = 1/a' - 1/b' \quad (4)$$

$$b'/a' = \tan\theta v / \tan\theta v' \quad (5)$$

Erase b' from equations (4) and (5), and substitute f=31.6 mm, a'=29.8 mm and θv=15° therein.

$2\theta_v'=1.74°$

Thus the divergence angle of a light beam in the vertical direction substantially equal to the aimed value 1.74° can be obtained.

Next, the formation of a beam in the horizontal direction will be described. Upon the element plane convex lens 81a, the element plane convex cylindrical lens 81b and the light transmission lens 81 constituted thereby, respective constants and variables as shown in FIG. 17 are defined as follow:

$F_1$ :focal length of the plane convex lens 81a (40 mm)

$F_2$ :focal length of the plane convex cylindrical lens 81b (being infinity theoretically, let it be $10^5$ mm for the sake of convenience for calculation)

A :distance from a second main point of the plane convex lens 81a to a light emission surface S (33 mm)

D :distance from the second main point of the plane convex lens 81a to a first main point of the plane convex cylindrical lens 81b (let it be 5.5 mm)

T :distance from the first main point of the plane convex cylindrical lens 81b to a second main point thereof (let it be 4 mm)

Z :distance from the second main point of the plane convex cylindrical lens 81b to a second main point of the combination lens F :focal length of the light transmission lens 81 obtained by combination A' :distance to the light emission surface S from a second main point of the light transmission lens 81 obtained by combination B' :distance to a virtual image of the light emission surface S from the second main point of the light transmission lens 81 obtained by combination $\theta_H$ :half a divergence angle of a light beam in the horizontal direction (10°/2=5°)

$\theta_H'$ :a divergence angle of a light beam passing through the light transmission lens 81 obtained by combination (half angle)

$W_H$ :width of the slit 81c

If $F_1$=40 mm, $F_2=10^5$ mm and D=5.5 mm are substituted into the relationship expression between the focal lengths $F_1$ and $F_2$ of the respective element lenses 81a and 81b and the focal length F of the combined lens 81, the combined focal length F can be obtained as follows:

$$F = (F_1 \cdot F_2)/(F_1 + F_2 - D) \qquad (6)$$
$$= (40 \cdot 10^5)/(40 + 10^5 - 5.5)$$
$$= 40 \text{ mm}$$

Next, the distance Z from the second main point of the plane convex cylindrical lens 81b to the second main point of the combined lens 81 can be expressed by:

$$Z = F - F_2(F_1 - D)/(F_1 + F_2 - D) \qquad (7)$$
$$= 40 - 10^5(40 - 5.5)/(40 + 10^5 - 5.5)$$
$$= 5.5 \text{ mm}$$

Let the distance A from the second main point of the plane convex lens 81a to the light emission surface S be 33 mm, and the distance T from the first main point of the plane convex cylindrical lens 81b to the second main point thereof be 4 mm. The distance A' to the light emission surface S from the second main point of the light transmission lens 81 obtained by combination can be expressed by:

$$A' = A - D + Z - T \qquad (8)$$
$$= 33 - 5.5 + 5.5 - 4$$
$$= 29 \text{ mm}$$

Upon the focal length F of the combined light transmission lens 81, the position of the light emission surface S of a semiconductor laser diode, and the divergence angle of a light beam, the following equations are established.

$$1/F=1/A'-1/B' \qquad (9)$$

$$B'/A'=\tan\theta_H/\tan\theta_H' \qquad (10)$$

Erase B' from equations (9) and (10), and substitute F=40 mm, A'=29 mm and $\theta_H$=5° therein.
$2\theta_H'=2.74°$ Thus the divergence angle of a light beam in the horizontal direction substantially equal to the aimed value 2.7° can be obtained.

The width $W_H$ of the slit 81c can be obtained as follows:

$$W_H = 2(A - D - T)\tan\theta_H \qquad (11)$$
$$= 2(33 - 5.5 - 4)\tan 5°$$
$$= 4.1 \text{ mm}$$

By way of example, there has been described the case where a plane convex lens and a cylindrical lens are integrally formed by injection molding by use of light transmissive resin as material. However, the plane convex lens and the cylindrical lens may be formed of light transmissive resin or glass independently of each other, the flat surfaces of the both being joined with each other by an adhesive.

Although the case where a light transmission lens is applied to a laser head of an optical distance measuring equipment has been described as an example, it is apparent that a laser head to which the light transmission lens according to the present invention is applied may have a desired sectional shape and be for any other usage such as supplying substantially parallel laser rays to an objective lens of an optical reader.

As has been described, according to a light transmission lens of a laser head according to the present invention, a plane convex lens and a plane convex or concave cylindrical lens are integrally formed by injection molding by use of light transmissive resin as material so that their flat surfaces are made common or intersect with each other. Accordingly, there is an effect that the thickness is reduced, and an integrated lens with a high shape accuracy can be manufactured with a high yield even by injection molding.

Figure 18:
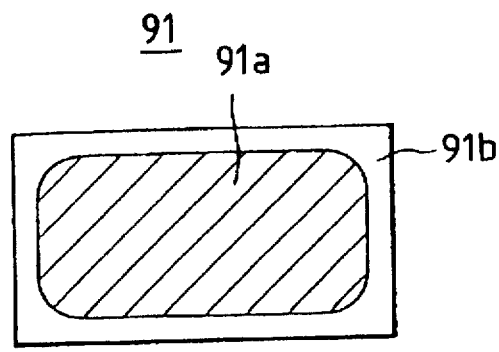
FIG. 18 is a plan view illustrating an embodiment of a light reception element of an optical distance measuring equipment according to the present invention.

FIG. 18 is a plan view illustrating an example of a light reception element of an optical distance measuring equipment according to the present invention. This light reception element 91 is constituted by an avalanche photodiode (APD) 91a formed at the center of a silicon substrate 91b. The area where the APD 91a is formed forms a light reception surface which is rectangular with an aspect ratio of approximately 1 to 2. The four corners of the APD 91a forming the light reception surface are gently curved to avoid the concentration of an electric field thereto, so that it can be intended to give stability and reliability to the operation. The light reception element 91 having such a configuration can be applied to the above-mentioned optical distance measuring equipment.

Figure 19:
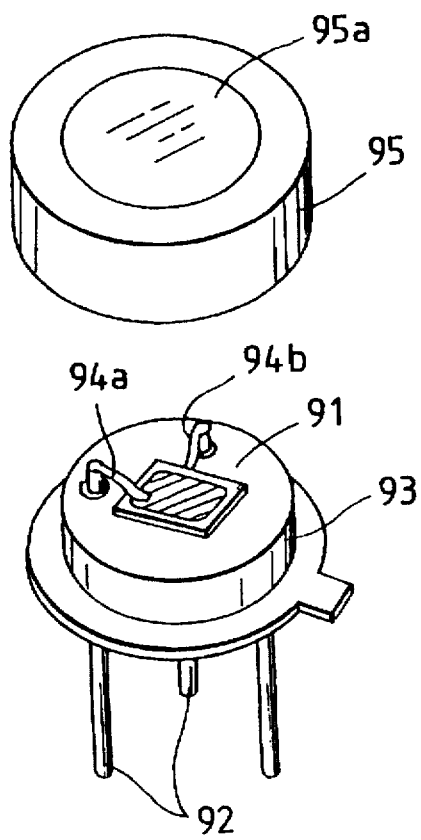
FIG. 19 is a perspective view illustrating the state where the light reception element in FIG. 18 is stored in a case.

FIG. 19 is a perspective view illustrating the state where the light reception element 91 in FIG. 18 is stored in a case. The light reception element 91 is positioned and fixed on a case substrate 93 having lead wires 92 by an adhesive. After the top end portions of the lead wires 92 and the light reception element 91 are connected to each other by metal foils 94a and 94b, a case cover 95 in which a glass window 95a is set is put and fixed on the peripheral portion of the substrate 93.

Although the case of APD as a light reception element has been described as an example, the present invention can be also applied to an ordinary photodiode or the like.

As has been described, in a light reception element of an optical distance measuring equipment according to the present invention, a light reception surface thereof has a substantially rectangular shape similar to a detection area. Accordingly, there is no useless area which does not contribute to photoelectric conversion. Therefore, there is an effect that the cost of manufacturing and the power consumption can be reduced, and the yield at the time of manufacturing, the operation speed, and the reliability of the element as a whole can be improved In addition, according to the light reception element of the present invention, there is an advantage that a slit for defining a detection area is unnecessary.

What is claimed is:

1. A light transmission lens of a laser head in which a substantially semi-spherical plane convex lens capable of compressing a light beam in both a longitudinal and a transverse direction and a plane convex cylindrical lens capable of compressing said light beam in only one of said longitudinal and transverse directions are integrally formed by injection molding by use of light transmissive resin as material in a manner so that respective flat surfaces of said plane convex lens and said plane convex cylindrical lens are made common to each other.

2. A light transmission lens of a laser head in which a substantially semi-spherical plane convex lens capable of compressing a light beam in both a longitudinal and a transverse direction and a plane concave cylindrical lens capable of compressing said light beam in only one of said longitudinal and transverse directions are integrally formed by injection molding by use of light transmissive resin as material in a manner so that respective flat surfaces of said plane convex lens and said plane concave cylindrical lens are made common to each other.

3. A light transmission lens of a laser head in which a substantially semi-spherical plane convex lens capable of compressing a light beam in both a longitudinal and a transverse direction and a plane concave cylindrical lens capable of compressing said light beam in only one of said longitudinal and transverse directions are integrally formed by injection molding by use of light transmissive resin as material in a manner so that respective flat surfaces of said plane convex lens and said plane concave cylindrical lens intersect with each other in an optical axis.

4. An integral light transmission lens of a laser head in which a substantially semi-spherical plane convex lens capable of compressing a light beam in both a longitudinal and a transverse direction and a plane convex cylindrical lens capable of compressing said light beam in only one of said longitudinal and transverse directions are joined with each other on respective flat surfaces of said plane convex lens and said plane convex cylindrical lens.

5. An integral light transmission lens of a laser head in which a substantially semi-spherical plane convex lens capable of compressing a light beam in both a longitudinal and a transverse direction and a plane concave cylindrical lens capable of compressing said light beam in only one of said longitudinal and transverse directions are joined with each other on respective flat surfaces of said plane convex lens and said plane concave cylindrical lens.

6. The light transmission lens according to claim 1, further comprising a slit in which a light absorbing layer is formed in a peripheral portion of a curved surface of said cylindrical lens.

7. The light transmission lens according to claim 1, wherein said laser head is a laser head of an optical distance measuring equipment.

8. The light transmission lens according to claim 7, wherein said laser head forms an irradiation surface having an aspect ratio of approximately 1 to 2.

9. A light transmission lens of a laser head which is constituted by a combination of a convex lens and a cylindrical lens.

10. The light transmission lens according to claim 4, further comprising a slit in which a light absorbing layer is formed in a peripheral portion of a curved surface of said cylindrical lens.

11. The light transmission lens according to claim 12, further comprising a slit in which a light absorbing layer is formed in a peripheral portion of a curved surface of said cylindrical lens.

12. The light transmission lens according to claim 9, wherein said laser head is a laser head of an optical distance measuring equipment.

13. The light transmission lens according to claim 10, wherein said laser head is a laser head of an optical distance measuring equipment.

14. The light transmission lens according to claim 11, wherein said laser head is a laser head of an optical distance measuring equipment.

15. The light transmission lens according to claim 12, wherein said laser head is a laser head of an optical distance measuring equipment.

16. A light transmission lens of a laser head, said lens comprising:

a substantially semi-spherical lens surface capable of compressing a light beam in both a longitudinal and a transverse direction; and a substantially semi-cylindrical lens surface opposite said substantially semi-cylindrical lens surface, said substantially semi-cylindrical lens surface capable of compressing said light beam in only one of said longitudinal and transverse directions, wherein, said lens is homogeneously formed as a solid unitary body.

* * * * *